United States Patent Office 3,394,999
Patented July 30, 1968

3,394,999
TRIAZIDOBORAZOLE
James N. Keith, Villa Park, and Stewart F. Musket and Morton J. Klein, Chicago, Ill., assignors to the United States of America as represented by the Secretary of the Air Force
No Drawing. Filed Sept. 24, 1963, Ser. No. 311,263
1 Claim. (Cl. 23—358)

ABSTRACT OF THE DISCLOSURE

The composition of matter triazidoborazole product of reacting trichloroborazole in chlorobenzene with an excess of sodium azide refluxed at 80–130° C. to the absence of the chloride ion from the reaction product, separating sodium salts from the reaction product, removing the solvent from the raw product, subliming the raw product at 100–140° C. and collecting in its solid state the end product composition of matter triazidoborazole.

---

This invention relates to the composition of matter triazidoborazole and to the process by which it is made.

Borazole of the empirical composition $B_3N_3H_6$ and of the structure

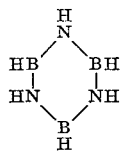

was discovered in 1926. A few inorganic derivatives of borazole have been reported.

In the preparation of boron nitride of a high degree of purity, such for example as in the preparation of B·N propellants and the like, it is desirable to have available borazole derivatives that contain only boron, nitrogen and hydrogen. At present borazole itself is the only such compound that is available.

The object of this invention is the preparation of triazidoborazole of the composition $B_3(N_3)_3N_3H_3$, structurally

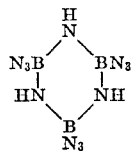

from the trichloro derivative of borazole, by the following procedure.

A desired quantity of trichloroborazole is dissolved in dry benzene or in anhydrous chlorobenzene. The resulting solution is combined with an excess of sodium azide of the composition $NaN_3$ to make a reaction mixture.

The reaction mixture is heated in refluxing apparatus maintained within the illustrative temperature range of about between 80° C. and 130° C.

The refluxing operation is continued until samplings indicate that the ionic chloride has virtually disappeared from the reaction mixture solution. Where the solvent used is benzene, the ionic chloride disappearance may be expected to require a month of refluxing. Where the solvent used is chlorobenzene, the disappearance of the ionic chloride will require two days, and hence the use of the chlorobenzene as solvent is preferred.

The reaction mixture solution is then separated from the residue of sodium salts that results from the addition to the reaction mixture solution of sodium azide in a suitable manner, such as by a filtering operation, decantation, or the like. The solvent is removed from the resulting solution by an evaporation process, or the like, leaving a raw product.

The raw product is confined within a container that is evacuated to a pressure of about 1 micron of mercury and is heated at a temperature in the range of about from 100° C. to 140° C. to accomplish the sublimation of substantially all of the end product that has been prepared. The end product in its solid state is deposited on a cold surface.

At room temperature of about 72° F. the end product is a white crystalline solid that is soluble in organic solvents such as benzene, chlorobenzene, diethyl ether and chloroform and is insoluble in carbon tetrachloride. The end product at room temperature hydrolyzes in moist air or in water with the evolution of heat.

The end product detonates violently when it is heated in a flame.

The end product in a chlorobenzene solution at room temperature of about 72° F. displays an infrared spectrum that has a well-defined maximum at $4.6\mu$, which indicates the presence of the $—N_3$ group.

It is to be understood that the process and the product that are disclosed herein are submitted as illustrative reductions to practice of the present invention, and that limited substitutions and modifications may be made therein without departing from the spirit and the scope of the present invention.

We claim:
1. Triazidoborazole of the structural formula

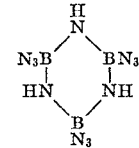

References Cited

UNITED STATES PATENTS

| | | | |
|---|---|---|---|
| 2,754,177 | 7/1956 | Gould | 23—358 |
| 3,030,174 | 4/1962 | Randolph et al. | 23—358 |
| 3,180,701 | 4/1965 | Laran | 23—358 |
| 3,248,168 | 4/1966 | Tyson | 23—358 X |

OTHER REFERENCES

Muszkat et al.: "Israeli Journal of Chemistry," vol. 1, pp. 27–31 (July 1963).

OSCAR R. VERTIZ, *Primary Examiner.*

H. S. MILLER, *Assistant Examiner.*